(12) United States Patent
Guintu

(10) Patent No.: US 7,066,510 B1
(45) Date of Patent: Jun. 27, 2006

(54) FOOD PRODUCT LIFTING AND POSITIONING DEVICE

(76) Inventor: Edgar V. Guintu, 4637 DeGrey La., Plano, TX (US) 75093

( * ) Notice: Subject to any disclaimer, the term of this patent is extended or adjusted under 35 U.S.C. 154(b) by 0 days.

(21) Appl. No.: 10/979,512

(22) Filed: Nov. 2, 2004

(51) Int. Cl.
*B65G 7/12* (2006.01)
(52) U.S. Cl. .......................................... 294/16; 294/106
(58) Field of Classification Search .................... 294/3, 294/11, 15, 16, 27.1, 28, 31.1, 106; 99/426, 99/427, 449, 450
See application file for complete search history.

(56) References Cited

U.S. PATENT DOCUMENTS

| | | | | |
|---|---|---|---|---|
| 799,421 | A | * | 9/1905 | Tscharner et al. ............. 294/28 |
| 850,582 | A | | 4/1907 | Horton |
| 1,588,774 | A | * | 6/1926 | Sallac .......................... 294/28 |
| 2,117,447 | A | * | 5/1938 | Paloni ........................ 294/106 |
| 2,450,716 | A | | 10/1948 | Chittick |
| 2,514,098 | A | | 7/1950 | Shreiner |
| 2,549,709 | A | | 4/1951 | Potts |
| 2,703,046 | A | | 3/1955 | Ahlquist |
| 2,973,218 | A | | 2/1961 | Schaum |
| 3,075,798 | A | | 1/1963 | Smith |
| 3,269,764 | A | * | 8/1966 | Coleman ..................... 294/16 |
| 3,292,831 | A | | 12/1966 | Moen |
| 3,338,486 | A | | 8/1967 | Gaylor |
| 3,374,026 | A | * | 3/1968 | Coleman ..................... 294/16 |
| 3,447,827 | A | | 6/1969 | Meszaros |
| 3,613,552 | A | | 10/1971 | Kean |
| 4,200,040 | A | | 4/1980 | MacRae |
| 4,334,463 | A | | 6/1982 | Goldie |
| 4,741,262 | A | | 5/1988 | Moncrief |
| 4,942,809 | A | | 7/1990 | Simmons |
| 4,955,971 | A | * | 9/1990 | Goulter .......................... 294/7 |
| 5,004,282 | A | * | 4/1991 | Perry .......................... 294/16 |
| D341,523 | S | | 11/1993 | Tiemann |
| D341,993 | S | | 12/1993 | Kadlick, Sr. |
| 5,638,742 | A | | 6/1997 | Kasaseya |
| 6,164,194 | A | | 12/2000 | Westmoreland |

OTHER PUBLICATIONS http://www.cooking.com/products/shprodde.asp?SKU=163778—Cooking.com, 'Stainless Steel Turkey/Roast Lifter Chain', printed Sep. 13, 2004.
http://www.cooking.com/products/shprodde.asp?SKU=207675—Cooking.com, 'Stainless Steel Poultry Lifters', printed Sep. 13, 2004.
http://www.cooking.com/products/shprodde.asp?SKU=207234—Cooking.com, 'Stainless Steel Roast Cutting Tongs', printed Oct. 28, 2004.

* cited by examiner

*Primary Examiner*—Dean J. Kramer
(74) *Attorney, Agent, or Firm*—Baker Botts L.L.P.

(57) ABSTRACT

A device for the lifting and positioning of a turkey or other food products such as roast, or ham, which is adapted to easily and safely lift the food product to and from a conventional cooking pot. The device generally comprises first and second clamping elements which are interconnected via a disengagable hinge in order to provide a clamping action to the food product being lifted. The disengagable hinge provides enhanced utility by allowing for individual placement of each of the first and second clamping mechanisms around the sides of the food product as well as for the relatively dense storage of the device when not in use. A novel handle is also disclosed that is ergonomically designed to enable transferring of the squeezing action of the hands of a user to the clamping action of the first and second clamping elements.

14 Claims, 4 Drawing Sheets

FOOD PRODUCT LIFTING AND POSITIONING DEVICE

BACKGROUND TO RELATED APPLICATIONS

Not applicable.

FIELD OF THE INVENTION

This invention relates to culinary tools, and more particularly, to a food product lifting and positioning device that lifts and position food products such as poultry, roasts, or ham in a stable manner; wherein the lifting and positioning device is not required to reside along with the food product during the cooking operation.

BACKGROUND OF THE INVENTION

The cooking and preparation of food products which includes poultry such as turkey, duck, or chicken, ham, or even beef products such as roasts in a cooking pan is a well known established practice in the culinary arts. However, removal of the food product from the cooking pan following the cooking operation has been known to be a burdensome task due to the bulky, tender structure of the food product which is further complicated by juices, which have formed on the surface thereof during the cooking operation that further limits the ability to be handled by a user. Moreover, the relatively hot temperature of the freshly cooked food product requires handling via special culinary tools that serve to shield the user from direct contact therewith in order to protect the user from potential harm such as skin burns and the like.

Several culinary tools have been developed for the purpose of safely and easily lifting a food product to and from the cooking pan which alleviates the need for direct user contact therewith. For example, U.S. Pat. No. 3,447,827 to Meszaros, Pat. No. D282,898 to Furian, and U.S. Pat. No. 5,941,584 describe food product lifting devices which provide a secure grasping action via a plurality of prongs which puncture the food product. However, it is well known in the culinary art that puncturing a food product such as turkey or roast, particularly during the preparation thereof, is detrimental in that juices, which would enhance the flavoring thereof, are allowed to escape. Additionally, holes formed in the food product tend to degrade the aesthetic qualities thereof, particularly if the meat is torn or mutilated by the prongs during the lifting action.

Other devices which provide a cradle-like support structure for the food product are exemplified by U.S. Pat. No. 2,703,046 to Ahlquist, U.S. Pat. No. 3,075,798 to Smith, and U.S. Pat. No. 3,613,552 to Kean. All of these devices are limited in that little or no lateral support is provided for the food product during the lifting operation. Thus, care must be taken to insure that the weight of the food product does not become unbalanced within the support structure lest toppling occurs. An attempt to solve this problem has been proposed by U.S. Pat. No. 4,200,040 to MacRae, wherein means are provided to springably bias the support structure against the food product in order to enhance the lateral stability thereof within the structure throughout the lifting process. However, the lateral holding forces provided by the spring biasing mechanism is fixed and thus is not easily adapted to varying types of food products having a wide range of shapes and sizes. All of these devices suffer in that the lifting device must be placed into the cooking pan along with the food product and must remain therein throughout the cooking operation. This aspect creates several negative salient ramifications; first, the handles of each of these devices ultimately becomes very hot during the cooking operation and thus must be handled using insulating means such as gloves or conventional "pot holders", secondly, the usage of handle mechanisms having an enlarged diameter for ease of gripping by a user, which are constructed of non-heat retaining materials such as plastic or wood, are not allowed in a harsh environment such as a conventional oven.

Accordingly, there has remained a long-felt need for a food product lifting and positioning device for easily lifting food products to and from any dimensioned conventional cooking pan in a manner which provides support as well as lateral stability for the food product and is adaptable for use with virtually any size or shape thereof, wherein the lifting device is inexpensive and easy to use, having none of the aforementioned disadvantages.

SUMMARY OF THE INVENTION AND OBJECTIVES

The present invention fulfills all of these needs as well as other needs via a food product lifting and positioning device which easily and safely lifts a food product to and from a conventional cooking pot via an apparatus which provides a clamping action to the food product, the force applied thereto being easily controlled by a user for gently grasping the sides thereof, thereby abating the problem of marring or mutilating the surface of the food product while being lifted. Furthermore, the clamping action of the present invention provides lateral stability as well as support for the food product in order to alleviate potential spillage problems caused by an unbalanced weight distribution of the food product while positioned within the lifting device.

The lifting device of the present invention generally comprises a first clamping element and a second clamping element which are disengagably interconnected at the upper ends thereof via a disengagable hinge means. The first and second clamping elements each have a pair of handles, which are disposed intermediate the upper end and lower end thereof, wherein both pairs of handles are spaced in co-radial relation to each other relative to the disengagable hinge means such that a squeezing action on the handles by a user biases the lower ends of the clamping elements together in order to provide a clamping action thereto for safely and securely lifting and positioning a food product such as turkey, ham, or roast of virtually any size.

One aspect of the present invention is a novel disengagable hinge means which provides for easy separation of the first and second clamping elements from each other, thus allowing for individual placement of each of the first and second clamping mechanisms around the sides of the food product. In many cases, the cooking pan which is used with the food product is chosen to be slightly larger than the girth thereof, thus leaving only a small distance from either side of the food product to the side of the pan. This novel feature provides advantage by enabling placement of each clamping element in between the side of the pan and the side of the food product one at a time in a manner such that manipulation of the clamping element is not hindered by the current position and orientation of its complementary clamping element. However when both of the clamping elements are properly oriented around the sides of the food product, squeezing of the handles by the user causes the disengagable hinge means to securely engage thus forming a fulcrum from which the lower ends of the clamping elements may securely grasp the food product.

Another aspect of the present invention is a food product lifting device which does not need to remain with the food product throughout the cooking operation. Thus, the device does not attain oven temperatures, which would otherwise preclude the use thereof without special handling equipment such as gloves or the like. Additionally, the present invention enables the use of ergonomically shaped handles formed of wood or thermoplastic materials which would clearly be unsuitable within the harsh environment of a heated oven.

It is therefore an object of the present invention to provide a food product lifting device for safely and securely lifting and positioning a turkey or other food products such as ham, or roast without necessitating direct contact thereof by a user.

A related object of the present invention is to provide a food product lifting device which provides support as well as lateral stability for the food product being lifted.

A further object of the present invention is to provide a food product lifting device which is adapted to lift a food product via a clamping action thereto, the force of the clamping action being directly controlled by a user in order to support said food product without placing undue pressure thereon.

Another object of the present invention is to provide a food product lifting device which does not need to remain with the food product throughout the cooking operation.

Another object of the present invention is to provide a food product lifting device which is easily manipulatable over the sides of the food product in spite of the same being disposed in a cooking pan having a girth which is only slightly larger than the girth of the food product.

Another object of the present invention is to provide a food product lifting device which is inexpensive to produce and thus inexpensive to the end-user.

These and other objects of the present invention will become readily apparent to those familiar with culinary tools and will become apparent in the following portions of the specification, wherein the detailed description is for the purpose of fully disclosing preferred embodiments of the invention without placing limitations thereon.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENT

Figure 1:
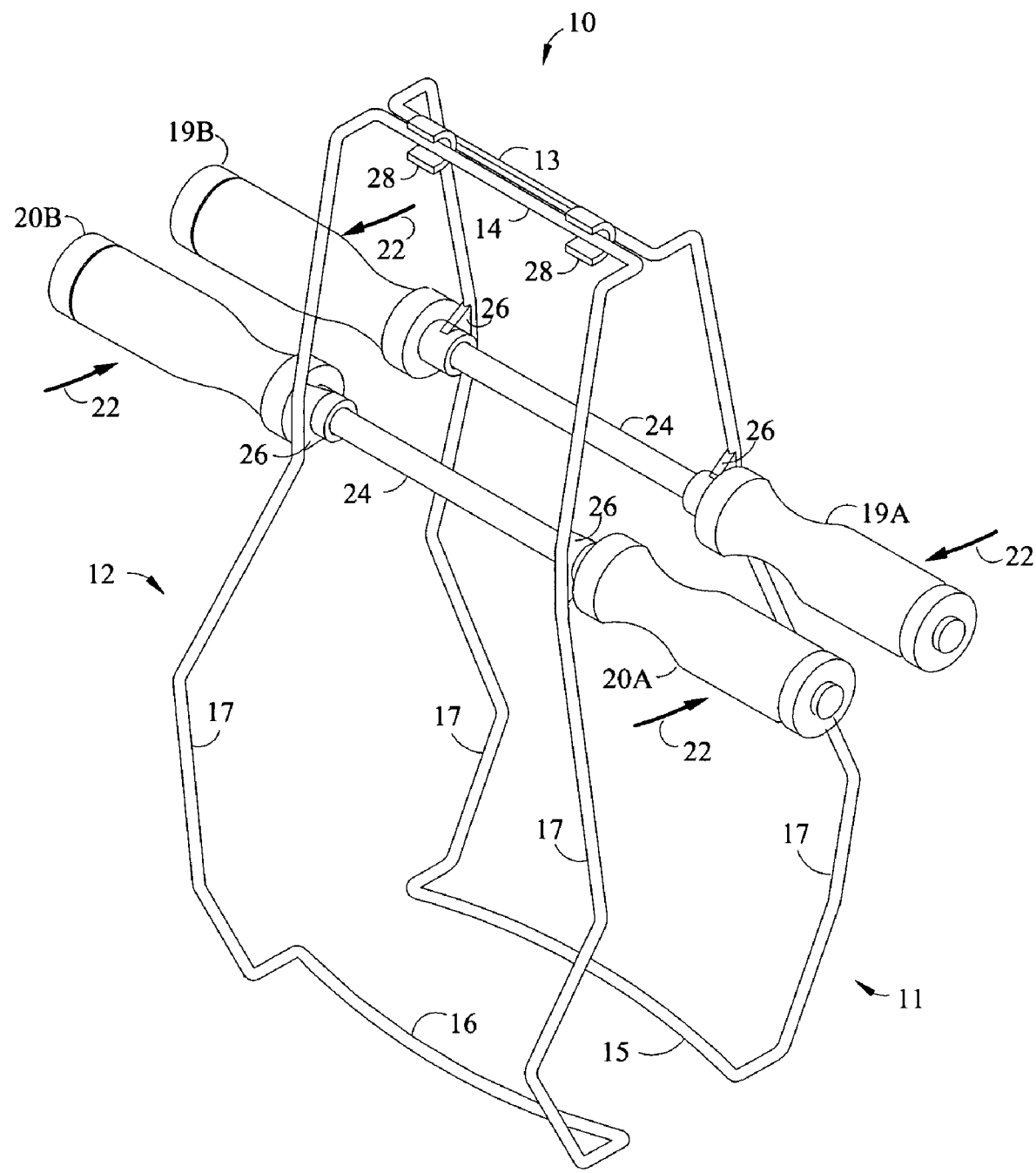
FIG. 1 is a perspective view of the preferred embodiment according to the present invention showing the two clamping elements, which are in operational orientation with respect to each other.
Figure 2:
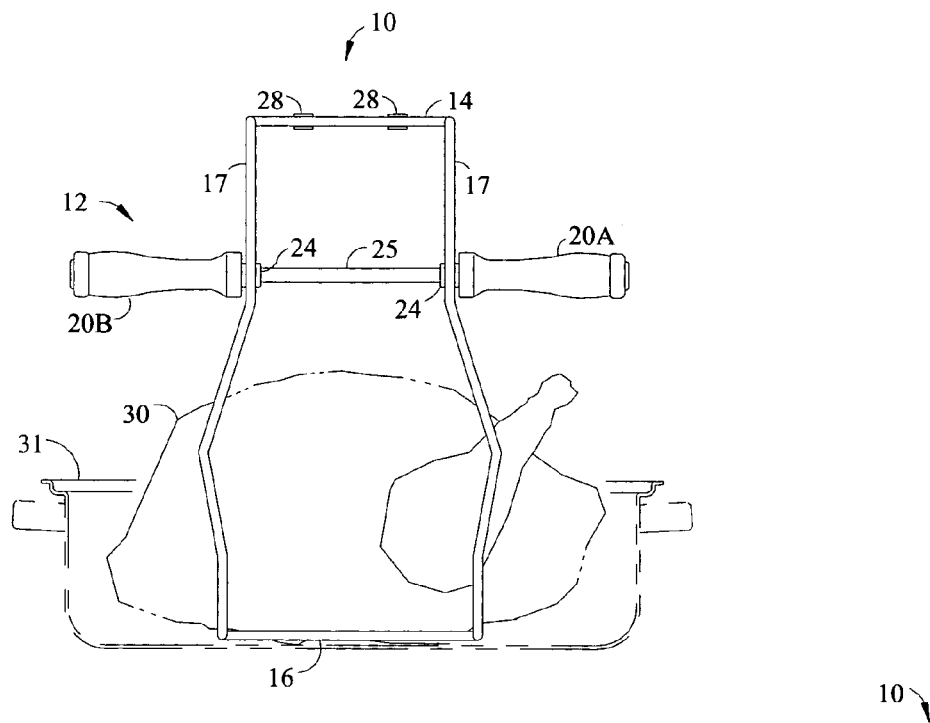
FIG. 2 is a front elevational view of the embodiment of FIG. 1 showing the second clamping element, which is properly placed around a turkey in preparation for the lifting operation thereof.
Figure 3:
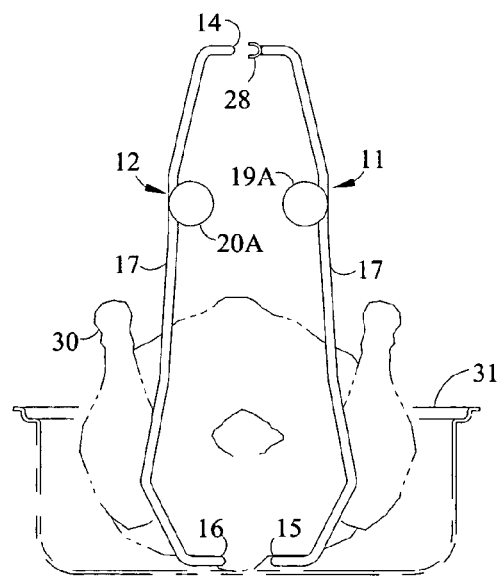
FIG. 3 is a side elevational view of the embodiment of FIG. 1 showing the first and second clamping elements, which are properly placed around a turkey in preparation for the lifting operation thereof.

Referring now to the drawings, a food product lifting device is shown according to the present invention designated by the reference numeral 10. The device 10 generally comprises a first clamping element 11, and a second clamping element 12, each having upper end portions (13 and 14), which are disengagingly interconnected via a disengagable hinging means, and food product support members (15 and 16) attached at the lower ends thereof, which are adapted to provide support for a food product 30 while being lifted. As shown in FIG. 1, the clamping elements (11 and 12) are in operational orientation with respect to each other and thus are prepared for lifting and positioning of a food product via squeezing forces shown by arrows 22 applied by the hands of a user upon the handles (19A, 19B, 20A, and 20B). The components of the food product lifting device are constructed in such a manner as to allow the lifting and positioning of an entire, unsectioned poultry item, particularly a turkey, to and from a cooking pan utilizing a handle means (to be described later), which enables easy manipulation by a user. As shown in FIGS. 2, 3, 5A, 5B, 5C, and 5D, the exemplary food product is a typical entire, unsectioned turkey that has been prepared for cooking; however it is to be appreciated that the unique clamping feature of the present invention provides for lifting and moving of many differing types of food products having virtually any shape or size including duck, chicken, roast, or even ham.

Each of the clamping elements (11 and 12) are preferably formed from an elongated piece of metallic rod having a solid cross-section, which is bent into the form of a loop. Each clamping element includes two generally vertically oriented leg members 17 which are adapted to leverage the forces applied to the handle means via the disengagable hinging means (to be described hereinafter) in order to retain a food product within the grasp of the device 10 proximate the lower end thereof. Although support for the food product 30 while being lifted may be supplied using any known means including the use of tines, prongs, and the like, food product support means is preferably provided by laterally oriented, inwardly projecting food product support members (15 and 16), which are integrally attached to the lower ends of the leg members 17. The support members (15 and 16), which project inwardly toward each other when the device is in the operational orientation, provide advantage by not puncturing the meat of the food product during the lifting operation. The lower portion of each of the leg members 17 are preferably bowed outwards in order to accommodate food products which inherently have a generally oblique shape. Additionally, the central portion of the food product support members (15 and 16) are preferably bowed outwards in order to form a stable platform for the food product.

Figure 4:
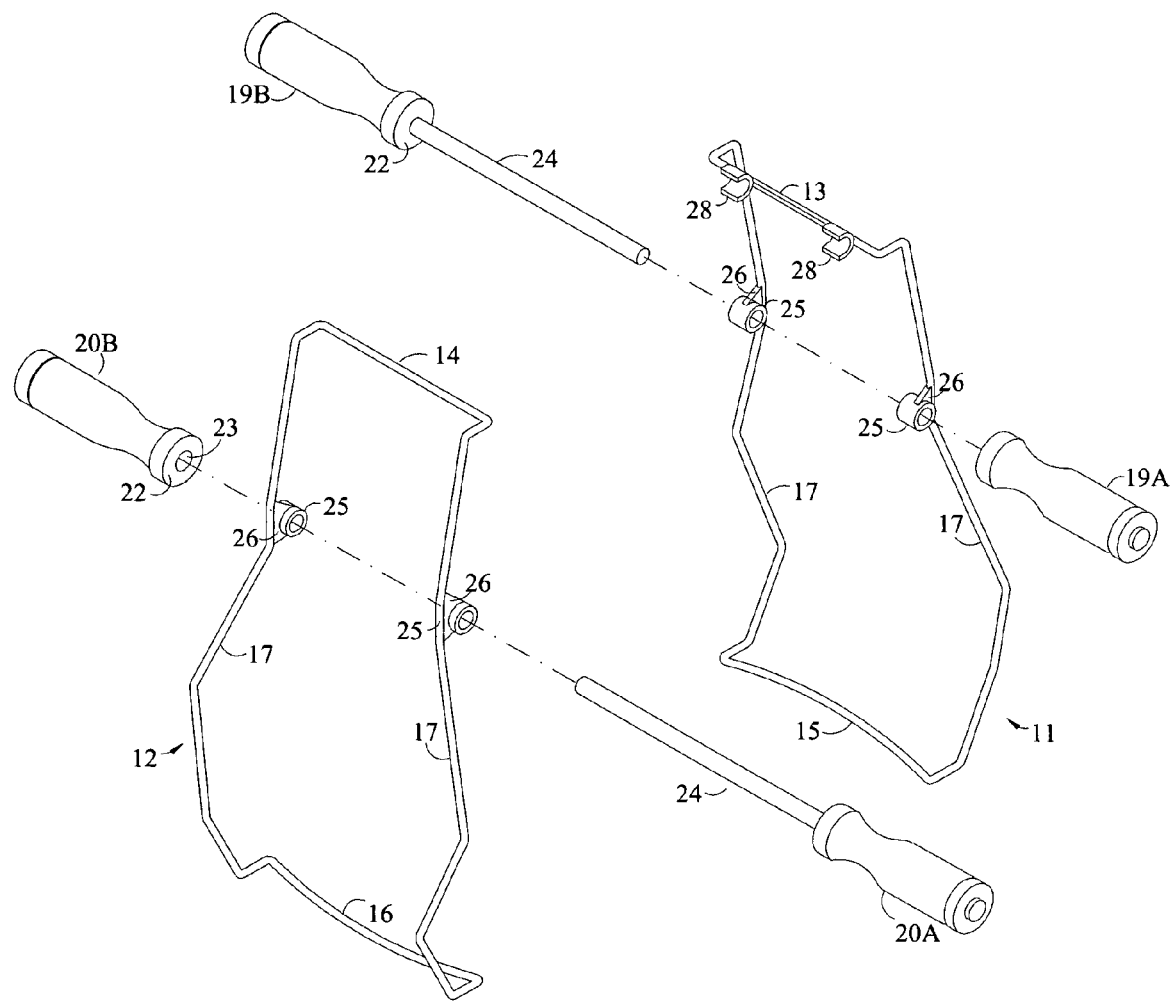
FIG. 4 is a perspective exploded view of the embodiment of FIG. 1 showing the pair of handle assemblies which are in proper orientation for releasable attachment thereof to the pair of clamping elements.

User manipulation of the lifting device 10 is provided by a handle means defined by a pair of handle assemblies, wherein each handle assembly has a pair of handles (19A, 19B, and 20A, 20B) which are each releasably affixed to each of the clamping elements (11 and 12) respectively. The design and function of the pair of handles (19A, and 19B) are substantially similar to the pair of handles (20A, and 20B), therefore only the pair of handles (19A, and 19B) that are releasably affixed to the clamping element 11 will be described for purposes of clarity. As best shown in the exploded view of FIG. 4, the pair of handles are defined by a generally cylindrically-shaped first handle 19A and second handle 19B which are constructed of any material, preferably plastic or wood, and most preferably wood each having an inner end 22. The inner end 22 of first handle 19B has an elongated metallic rod 24 coaxially attached thereto by being impaled therein and secured thereto using any general purpose adhesive. Conversely, second handle 19A is releasably attachable to the metallic rod 24 using a blind hole 23 co-axially formed in the inner end 22 thereof, which is sized to allow insertion of the metallic rod 24 therein via a snug friction fit. Although the present invention describes a releasable attachment means of the second handle 19A to the metallic rod 24 via a snug friction fit, it is to be understood that other releasable attachment means may be incorporated such as a detent mechanism which provides a snapping action of the second handle 19A onto the metallic rod 24. Nevertheless, the handle assembly is releasably engaged onto the clamping element 11 intermediate the upper end portion and lower end thereof, such that the axis of the handle assembly is substantially parallel to the axis of the hinging means. The handle assembly is held in fixed relation to the clamping element 11 via a pair of metallic sleeves 25, which are attached to the clamping element 11 via bracket members 26 using typical welding techniques. The inner bore of each of the sleeves are sized to allow the metallic rod 24 to freely slide and rotate therein. Thus, the handles (19A, and 19B) may be releasably engaged onto the clamping member 11 by inserting the metallic rod 24 through both of the sleeves 25 and then releasably attaching the handle 19A onto the metallic rod 24 by pressing the handles (19A and 19B) together using a moderate force, wherein the aforementioned procedure is reversed in order to remove the handles from the clamping element. The handles (19A and 19B) are designed to be removable in order to provide for the dense storage thereof when not in use, however it is to be understood that both handles may be affixedly attached to the metallic rod 24 if dense storage of the device 10 is not required. Moreover, the present embodiment describes the use of handles (19A and 19B) which are allowed to freely rotate within the sleeves 25 relative to the clamping element 11, wherein the freely rotatable handles provide for enhances positioning of the hands of a user prior to the lifting action; however it is to be understood that the handles (19A and 19B) may be affixedly attached to the clamping element 11 if this feature is not needed or desired.

As described hereinabove, a hinging means exists at the upper end portions (13 and 14) of the clamping elements (11 and 12) in order to provide a pivotable axis for the clamping action of the device 10. Preferably, the hinging means is easily disengagable in nature, thus allowing for separation of the clamping elements for dense storage or for intricate placement around a food product to be lifted or positioned. The hinging means generally comprises a pair of semicircular shaped members defining a hinge seat 28 which are attached to the upper end portion 13 of clamping element 111 and act as receptacles for a hinge pin defined by the upper end portion 14 of clamping element 12. The hinge seats 28 are preferably formed of metal and are attached to the upper end portion 13 using conventional welding techniques. As shown in FIG. 1, the clamping elements (11 and 12) are in operational orientation with respect to each other and thus are prepared for lifting and positioning of a food product via a squeezing force shown by arrows 22 applied by the hands of a user upon the handles. Thus, when handles (19A, and 20A) and (19B and 20B) are squeezed by the hands of a user, the hinging means provided by the upper end portion 14 of clamping element 12 which is seated in hinge seats 28 provides a stable pivot point from which to apply a clamping force on the food product. However, when engagement of the hinging means of the device 10 is not necessary, the present hinging means allows for easy separation of the two clamping elements by pulling away each of the elements (11 and 12) from each other.

Figure 5A:
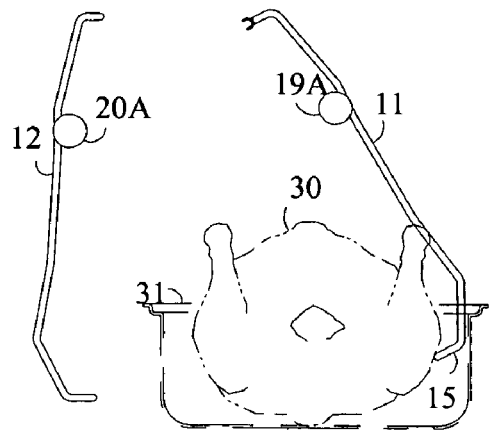
FIG. 5A is a side elevational view of the embodiment of FIG. 1 wherein the first clamping element is in the process of being placed around the side of a turkey.
Figure 5B:
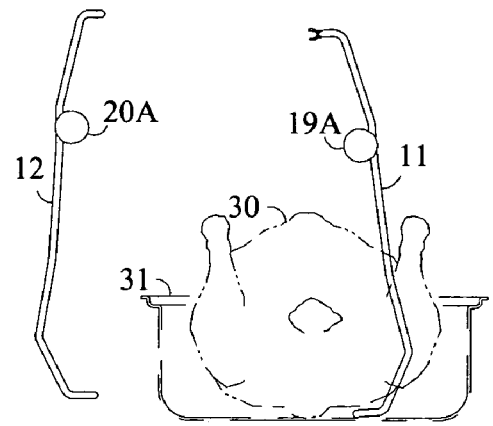
FIG. 5B is a side elevational view of the embodiment of FIG. 1 wherein the first clamping element is in proper orientation with respect to the turkey in preparation for the lifting operation thereof.
Figure 5C:
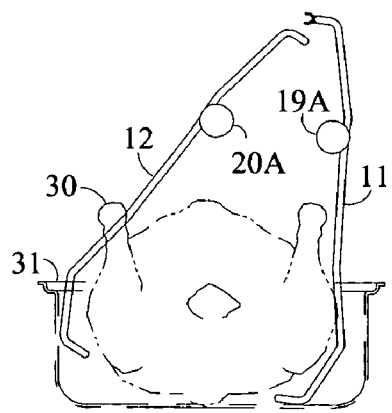
FIG. 5C is a side elevational view of the embodiment of FIG. 1 wherein the second clamping element is in the process of being placed around the side of a turkey.
Figure 5D:
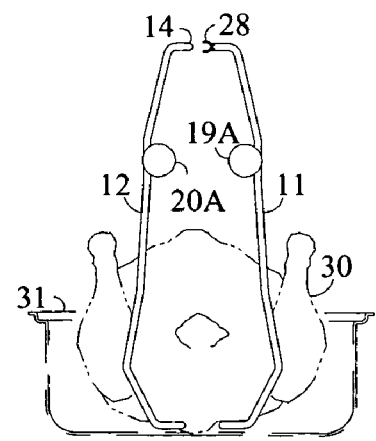
FIG. 5D is a side elevational view of the embodiment of FIG. 1 wherein the first and second clamping elements are in proper position around the sides of a turkey in preparation for the lifting operation thereof.

The disengagable feature of the hinging means provides a unique benefit for the user in that the clamping elements (11 and 12) may be individually positioned around the sides of a food product one-at-a-time during preparation for the lifting and positioning operation. This feature is particularly beneficial in situations where the girth of the cooking pan is only slightly larger than the girth of the food product. FIGS. 5A, 5B, 5C, and 5D depict an exemplary method of positioning the clamping elements of the present invention around the sides of the food product in preparation for the lifting operation. As shown in FIG. 5A, the clamping element 11 is initially positioned at an oblique orientation in order to allow the food product support member 15 to be inserted in between the side of the turkey and the side of the cooking pan, wherein following insertion, the clamping element 11 may again be oriented in the upright position as shown in FIG. 5B. Next, the other clamping element 12 may be inserted in between the side of the turkey and the side of the cooking pan 31 in a similar manner as shown in FIGS. 5C, and 5D. In order to lift the turkey from the pan 31, handles (19A, and 20A) are gripped by one hand and handles (19B and 20B) are gripped by the other hand of a user and then squeezed in order to grasp the turkey while lifting from the pan. A similar procedure would be used by the device 10 for placement of the turkey 30 into the pan 31.

The present invention may be embodied in other specific forms without departing from the spirit or scope of the invention. For example, although the clamping elements were implemented using elongated section of metallic rod material formed into a loop, it is known in the art that a similar function would be supplied using a sheet of material such as sheet metal having an approximately similar overall shape would be a valid substitute. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A lifting and positioning device for food products such as poultry, roasts, and hams, said lifting device comprising:
    first and second clamping elements each having an upper end portion and a lower end, said each clamping element having a food product support member attached at the lower end thereof for grasping said food product via a clamping action, said first and second clamping elements being interconnected by;

a disengagable hinge which provides a pivotable axis for the clamping action of said first and second clamping elements, said hinge comprising a hinge seat attached to the upper end portion of said first clamping element and a hinge pin attached to the upper end portion of said second clamping element, wherein said hinge pin is releasably engagable within said hinge seat such that said hinge pin is pivotably engaged within said hinge seat while in operational orientation and wherein said hinge pin is easily disengagable from said hinge seat when not in said operational orientation, said hinge is engagable to pivotably interconnect said first and second clamping elements thereby defining an operational orientation, and wherein said hinge is disengagable in order to provide for separation of said first and second clamping elements when not in said operational orientation; and, a handle means for transferring the squeezing action of the hands of a user to the clamping action of said first and second clamping elements, said handle means being at least releasably engagable onto each of said first and second clamping elements.

2. The lifting and positioning device for food products of claim 1 wherein said hinge pin is the upper end portion of the second clamping element.

3. The lifting and positioning device for food products of claim 1, wherein said food product support member comprises a pair of laterally oriented members which are each attached to the lower end of each of said first and second clamping elements, said pair of laterally oriented members projecting inwardly toward each other in order to provide support for said food product during said clamping action.

4. The lifting and positioning device for food products of claim 1, wherein each of said first and second clamping elements are formed from an elongated piece of metallic rod which is bent into the form of a loop.

5. The lifting and positioning device for food products of claim 1, wherein said handle means is at least releasably engagable onto each of said first and second clamping elements intermediate the upper end portions and lower ends thereof.

6. The lifting and positioning device for food products of claim 5, wherein said handle means is a pair of handle assemblies, wherein each of said pair of handle assemblies being releasably engagable onto each of said first and second clamping elements, the axis of both pair of said handle assemblies being substantially parallel to the axis of said hinge, each said handle assembly comprising:

first and second generally cylindrically-shaped handles each having an inner end, said second handle having a blind hole coaxially formed in the inner end thereof; and, an elongated rod defining a solid circular cross-section having proximal and distal ends, the proximal end of said elongated rod being coaxially attached to the inner end of said first handle and said distal end of said elongated rod being releasably insertable into the blind hole of said second handle via a snug friction fit.

7. The lifting and positioning device for food products of claim 5, wherein said handle means is a pair of handle assemblies, wherein each of said pair of handle assemblies being affixedly engaged onto each of said first and second clamping elements, the axis of both pair of said handle assemblies being substantially parallel to the axis of said hinge, each said handle assembly comprising:

first and second generally cylindrically-shaped handles each having an inner end; and, an elongated rod defining a solid circular cross-section having proximal and distal ends, the proximal end of said elongated rod being coaxially attached to the inner end of said first handle and said distal end of said elongated rod being coaxially attached to the inner end of said second handle.

8. A lifting and positioning device for food products such as poultry, roasts, and hams, said lifting device comprising:

first and second clamping elements each having an upper end portion and a lower end, said each clamping element having a food product support means attached at the lower end thereof for grasping said food product via a clamping action, said first and second clamping elements being interconnected by:

a disengagable hinging means which provides a pivotable axis for the clamping action of said first and second clamping elements, said hinging means is engagable to pivotably interconnect said first and second clamping elements thereby defining an operational orientation, and wherein said hinging means is disengagable in order to provide for separation of said first and second clamping elements when not in said operational orientation; and, a handle means for transferring the squeezing action of the hands of a user to the clamping action of said first and second clamping elements, said handle means being at least releasably engagable onto each of said first and second clamping elements intermediate the upper end portions and lower ends thereof;

wherein said device is adapted to lift and position an entire, unsectioned poultry item to and from a cooking pan.

9. The lifting and positioning device for food products of claim 8, wherein said food product support means comprises a pair of laterally oriented members which are each attached to the lower end of each of said first and second clamping elements, said pair of laterally oriented members projecting inwardly toward each other in order to provide support for said food product during said clamping action.

10. The lifting and positioning device for food products of claim 8, wherein each of said first and second clamping elements are formed from an elongated piece of metallic rod which is bent into the form of a loop.

11. The lifting and positioning device for food products of claim 8, wherein said handle means is a pair of handle assemblies, wherein each of said pair of handle assemblies being releasably engagable onto each of said first and second clamping elements, the axis of both pair of said handle assemblies being substantially parallel to the axis of said hinging means, each said handle assembly comprising:

first and second generally cylindrically-shaped handles each having an inner end, said second handle having a blind hole coaxially formed in the inner end thereof; and, an elongated rod defining a solid circular cross-section having proximal and distal ends, the proximal end of said elongated rod being coaxially attached to the inner end of said first handle and said distal end of said elongated rod being releasably insertable into the blind hole of said second handle via a snug friction fit.

12. The lifting and positioning device for food products of claim 8, wherein said handle means is a pair of handle assemblies, wherein each of said pair of handle assemblies being affixedly engaged onto each of said first and second clamping elements, the axis of both pair of said handle assemblies being substantially parallel to the axis of said hinging means, each said handle assembly comprising:

first and second generally cylindrically-shaped handles each having an inner end; and, an elongated rod defining a solid circular cross-section having proximal and distal ends, the proximal end of said elongated rod being coaxially attached to the inner end of said first handle and said distal end of said elongated rod being coaxially attached to the inner end of said second handle.

13. A lifting and positioning device for food products such as poultry, roasts, and hams, said lifting device comprising:

first and second clamping elements each having an upper end portion and a lower end, said each clamping element having a food product support member attached at said lower end portion for grasping said food product via a clamping action, said first and second clamping elements being interconnected by;

a disengagable hinge which provides a pivotable axis for the clamping action of said first and second clamping elements, said hinge being selectively engagable or disengagable to couple and uncouple, respectively, said first and second clamping elements such that said hinge is engagable to pivotably interconnect said first and second clamping elements thereby defining an operational orientation, and wherein said hinge is disengagable in order to provide for separation of said first and second clamping elements when not in said operational orientation, said hinge disposed at the upper end portion of said first and second clamping elements; and, a handle which is releasably attached or affixedly attached to each of said first and second clamping elements, wherein said handles are disposed intermediate said disengagable hinge and said food product support member, said handles being adapted for transferring the squeezing action of the hands of a user to the clamping action of said first and second clamping elements.

14. The lifting and positioning device for food products of claim 13, wherein said disengagable hinge comprises a hinge seat attached to the upper end portion of said first clamping element and a hinge pin attached to the upper end portion of said second clamping element.

\* \* \* \* \*